US012793336B2

(12) United States Patent
Westerhof et al.

(10) Patent No.: US 12,793,336 B2
(45) Date of Patent: Nov. 10, 2026

(54) APPARATUS, METHOD AND COMPUTER PROGRAM FOR PRODUCING A STREAM OF VIDEO DATA OF A VIRTUAL ENVIRONMENT

(71) Applicant: Beyond Sports B.V., Alkmaar (NL)

(72) Inventors: Nicolaas Jan Westerhof, Rotterdam (NL); Simon Johannes Schouten, Alkmaar (NL)

(73) Assignee: BEYOND SPORTS B.V., Alkmaar (NL)

( * ) Notice: Subject to any disclaimer, the term of this patent is extended or adjusted under 35 U.S.C. 154(b) by 119 days.

(21) Appl. No.: 18/827,717

(22) Filed: Sep. 7, 2024

(65) Prior Publication Data

US 2025/0104348 A1 Mar. 27, 2025

(30) Foreign Application Priority Data

Sep. 22, 2023 (GB) ..................................... 2314606

(51) Int. Cl.
*G06T 17/00* (2006.01)
*G06V 20/40* (2022.01)

(52) U.S. Cl.
CPC .............. *G06T 17/00* (2013.01); *G06V 20/44* (2022.01)

(58) Field of Classification Search
None
See application file for complete search history.

(56) References Cited

U.S. PATENT DOCUMENTS

| | | | |
|---|---|---|---|
| 8,294,732 B2 | 10/2012 | Cheng | |
| 10,403,022 B1 | 9/2019 | Silva | |
| 2013/0303248 A1 | 11/2013 | Williams et al. | |
| 2019/0287302 A1 | 9/2019 | Bhuruth | |
| 2020/0035019 A1 * | 1/2020 | Cappello | G06T 7/536 |
| 2020/0329189 A1 * | 10/2020 | Tanaka | G06T 17/20 |
| 2021/0093968 A1 | 4/2021 | Mccoy | |

FOREIGN PATENT DOCUMENTS

WO WO-2022063177 A1 3/2022

OTHER PUBLICATIONS

Search Report from corresponding GB Application No. 2314606.1, mailed on Mar. 5, 2024, 3 pages.

* cited by examiner

*Primary Examiner* — Nurun Flora
(74) *Attorney, Agent, or Firm* — Tucker Ellis LLP

(57) ABSTRACT

An apparatus for producing a stream of video data of a virtual environment is provided, the apparatus comprising circuitry configured to: acquire a virtual environment, the virtual environment being output of a simulation of a physical environment; detect occurrence of an event in the virtual environment; control at least one virtual camera in the virtual environment in dependence upon a detected event within the virtual environment, wherein the at least one virtual camera captures a view within the virtual environment; and produce a stream of video data of the virtual environment using the at least one virtual camera.

18 Claims, 11 Drawing Sheets

APPARATUS, METHOD AND COMPUTER PROGRAM FOR PRODUCING A STREAM OF VIDEO DATA OF A VIRTUAL ENVIRONMENT

CROSS REFERENCE TO RELATED APPLICATIONS

The present application claims priority to GB Application No. 2314606.1, filed Sep. 22, 2023, the content of which is incorporated herein by reference in its entirety.

BACKGROUND

Field of the Disclosure

The present invention relates to an apparatus, method and computer program for producing a stream of video data of a virtual environment.

Description of the Related Art

The "background" description provided herein is for the purpose of generally presenting the context of the disclosure. Work of the presently named inventors, to the extent it is described in the background section, as well as aspects of the description which may not otherwise qualify as prior art at the time of filing, are neither expressly or impliedly admitted as prior art against the present invention.

Motion tracking data can be acquired to track the movement of an object. There are many different ways by which such motion tracking data (or tracking data) can be obtained. For example, tracking data can be obtained using a tracking device (such as a sensor) attached to an object. Such a sensor can include an inertial measurement unit (IMU) sensor, for example. Alternatively, tracking data can be obtained from captured image data.

The motion tracking data can be used to generate a simulation of an object in a virtual environment. This is particularly advantageous when applied to certain events—such as sporting events—as additional visualisations or analysis can be performed using the simulation of the object. This can lead to a greater understanding and appreciation of the event.

A virtual camera can be used to display a view of the simulation. However, it can be difficult and time consuming to produce a video stream of the simulation which can be consumed by an end user which contains an appropriate view of the simulation.

This problem can be exacerbated in situations requiring a video stream (such as sporting events or the like).

It is an aim of the present disclosure to address these issues.

SUMMARY

Embodiments of the present disclosure are defined by the appended claims. Further aspects of the present disclosure are defined by the dependent claims.

In accordance with embodiments of the disclosure, a stream of video data (such as a live stream of video data) containing an appropriate view of a virtual environment can be produced more easily and efficiently.

The present disclosure is not particularly limited to these technical effects. Other technical effects will become apparent to the skilled person when reading the disclosure.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
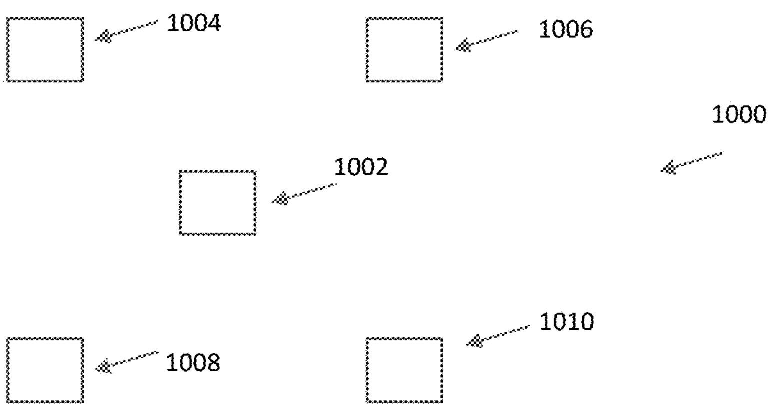
FIG. 1 illustrates an apparatus in accordance with embodiments of the disclosure.

Referring now to the drawings, wherein like reference numerals designate identical or corresponding parts throughout the several views.

Referring to FIG. 1, an apparatus 1000 according to embodiments of the disclosure is shown. Typically, an apparatus 1000 according to embodiments of the disclosure is a computer device such as a personal computer or a terminal connected to a server. Indeed, in embodiments, the apparatus may also be a server. The apparatus 1000 is controlled using a microprocessor or other processing circuitry 1002. In some examples, the apparatus 1000 may be a portable computing device such as a mobile phone, laptop computer or tablet computing device.

The processing circuitry 1002 may be a microprocessor carrying out computer instructions or may be an Application Specific Integrated Circuit. The computer instructions are stored on storage medium 1004 which maybe a magnetically readable medium, optically readable medium or solid state type circuitry. The storage medium 1004 may be integrated into the apparatus 1000 or may be separate to the apparatus 1000 and connected thereto using either a wired or wireless connection. The computer instructions may be embodied as computer software that contains computer readable code which, when loaded onto the processor circuitry 1002, configures the processor circuitry 1002 to perform a method according to embodiments of the disclosure.

Additionally, an optional user input device 1006 is shown connected to the processing circuitry 1002. The user input device 1006 may be a touch screen or may be a mouse or stylist type input device. The user input device 1006 may also be a keyboard or any combination of these devices.

A network connection 1008 may optionally be coupled to the processor circuitry 1002. The network connection 1008 may be a connection to a Local Area Network or a Wide Area Network such as the Internet or a Virtual Private Network or the like. The network connection 1008 may be connected to a server allowing the processor circuitry 1002 to communicate with another apparatus in order to obtain or provide relevant data. The network connection 1002 may be behind a firewall or some other form of network security.

Additionally, shown coupled to the processing circuitry 1002, is a display device 1010. The display device 1010, although shown integrated into the apparatus 1000, may additionally be separate to the apparatus 1000 and may be a monitor or some kind of device allowing the user to visualise the operation of the system. In addition, the display device 1010 may be a printer, projector or some other device allowing relevant information generated by the apparatus 1000 to be viewed by the user or by a third party.

Figure 2:
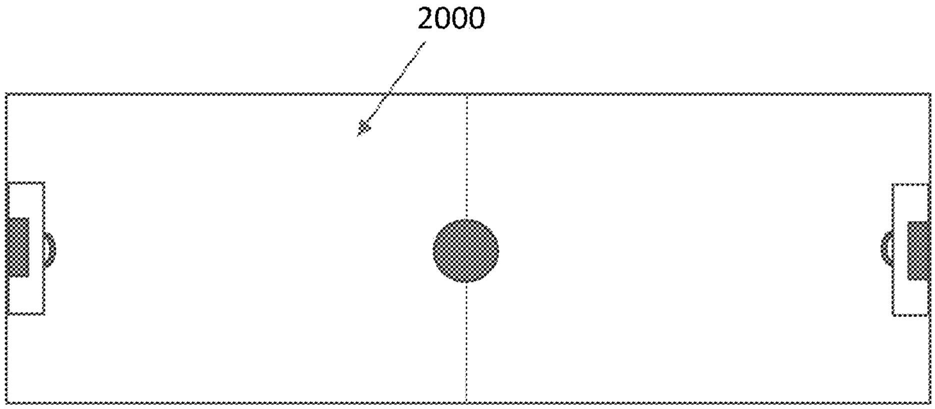
FIG. 2 illustrates an example situation to which embodiments of the disclosure may be applied.

Consider, now, FIG. 2 of the present disclosure. FIG. 2 illustrates an example situation to which embodiments of the disclosure can be applied. Specifically, FIG. 2 illustrates a sporting event (or sporting environment). In examples, the sporting event may optionally include either ice-hockey, soccer (football), American football, baseball, motorsport, tennis, rugby, cricket or basketball. Of course, embodiments of the disclosure may also be applied to other sporting events and/or other environments other than sporting events. Indeed, more generally, embodiments of the disclosure may be applied to any situation or sporting event. Indeed, embodiments of the disclosure may more generally be applied to any physical environment (including, for example, an environment such as a concert, a performance or the like).

In this example, a number of players (not shown) play the soccer match on the soccer pitch. These players form two teams, with each team trying to score by kicking a ball (not shown) into the opponent's goal.

Motion data from the soccer match (such as motion data relating to the players and/or motion data relating to the objects) may be used in order to generate a simulation of the soccer match. The simulation of the soccer match may produce a virtual environment (such as a three dimensional virtual environment) in which a virtual representation of the players are shown. This enables greater analysis or visualization (including data augmentation) to be performed.

The way in which the motion data from the soccer match is used in order to generate a simulation of the soccer match is not particularly limited in the present disclosure. For example, a virtual character may be animated (within a virtual environment) using motion data from the soccer match (the real world environment). Any suitable method for generating the simulation known in the art may be used.

A virtual camera can be used to display a view of the simulation. However, it can be difficult and time consuming to produce a video stream of the simulation which can be consumed by an end user which contains an appropriate view of the simulation. In particular, it can be difficult to control a virtual camera within the virtual environment in order that an appropriate view is provided.

This makes it difficult to utilize a simulation to provide a video stream to a user. For example, a broadcaster may find it difficult and time consuming to include a video from a simulation of the sporting event in a stream of video (such as a live broadcast) of the sporting event.

In view of the above (in addition to those reasons described in the Background) an apparatus, method and computer program are provided for producing a stream of video data of a virtual environment.

<Apparatus>

Figure 3:
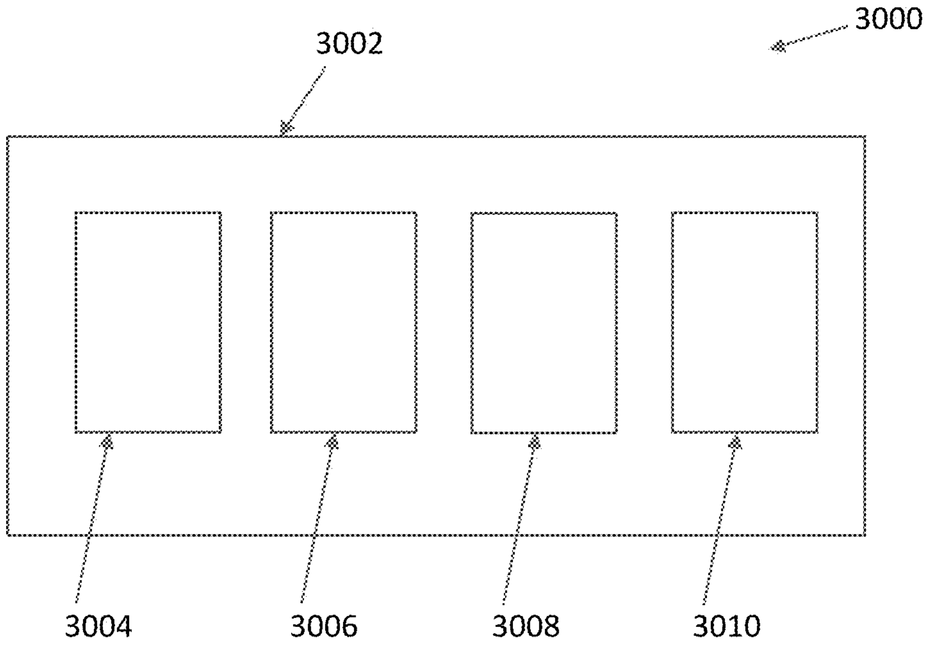
FIG. 3 illustrates an apparatus in accordance with embodiments of the disclosure.

FIG. 3 illustrates an apparatus in accordance with embodiments of the disclosure. The apparatus 3000 is an apparatus for producing a stream of video data of a virtual environment.

The apparatus 3000 comprises an acquiring unit 3004, a detection unit 3006, a control unit 3008 and a producing unit 3010.

The acquiring unit 3004 is configured to acquire a virtual environment, the virtual environment being output of a simulation of a physical environment.

The detection unit 3006 is configured to detect occurrence of an event in the virtual environment.

In examples, the detection of the occurrence of the event in the virtual environment may be performed by the detection unit 3006 monitoring the virtual environment over time. In examples, detection of the event in the virtual environment may be performed by monitoring data (such as tracking data) used in order to generate the virtual environment (i.e. data underlying the virtual environment). In examples, the detection performed by the detection unit 3006 can detect occurrence of an event in the virtual environment by detecting a signal (such as a flag, a message, an instruction or the like) from an external apparatus (such as an external data provider or the like). That is, the external data provider may identify that a certain event occurs (either in the physical environment or in the virtual environment (which is a simulation of the physical environment)). Then, upon identifying the occurrence of the event, the external data provider may generate a signal (such as a flag, a message, an instruction or the like) which is then detected by the detection unit 3006 in order to detect occurrence of the event in the virtual environment.

In examples, when the detection unit 3006 detects the event based upon a signal (such as a flag, a message, an instruction or the like) from the external data provider, the apparatus 3000 may be configured to perform synchronisation between the signal from the external data provider and the virtual environment which has been acquired by the acquiring unit 3004. That is, in examples, the apparatus 3000 may perform processing to understand a time offset between the virtual environment and the external data provider. In examples, this may include a constant offset. In examples, the time offset between the virtual environment and the external data provider may vary depending on the type of event which is occurring. Therefore, in examples, the detection unit 3006 may perform detection in the virtual environment when a signal is received from the external data provider in order to detect the event in the virtual environment which has been detected (and signalled) by the external data provider. The apparatus may synchronise the data from the external data provider and the virtual environment based upon this dual detection of the event.

The control unit 3008 is configured to control at least one virtual camera in the virtual environment in dependence upon a detected event within the virtual environment, wherein each of the at least one virtual cameras captures a different view within the virtual environment.

The producing unit 3010 is configured to produce a stream of video data of the virtual environment using the at least one virtual camera.

In this way, a stream of video data (such as a live stream of video data) can be produced of a simulation can be produced more easily and efficiently. In particular, apparatus 3000 will control at least one virtual camera in the virtual environment in dependence upon a detected event within the virtual environment. Therefore, the stream of video data produced using the at least one virtual camera will be appropriate for the event which has been detected.

Taking the example of the soccer match as described with reference to FIG. 2 of the present disclosure, apparatus 3000 will monitor the simulation of the soccer match to detect the occurrence of an event (such as a player scoring a goal, or the like). Then, the at least one virtual camera will be controlled in dependence upon the detected event. For example, the at least one virtual camera may be controlled in order to capture a view of the player who has scored the goal.

Again, taking soccer as an example, an event is an action which happens during or as part of the soccer match. Such events are not particularly limited and vary depending upon the situation to which embodiments of the disclosure are applied (such as the type of sport). In a soccer match, an event may include at least one of a goal, a shot, a shot on goal, a miss, a save, a tackle, a pass, a foul, an offside, a corner, a free kick, a penalty kick, a goal kick, a shot type (e.g. header, inside foot or the like), a duel, a yellow/red card, a substitution, a stoppage, halftime and/or start or end of the match.

Indeed, as the at least one virtual camera is controlled in dependence upon the detected event within the virtual environment, it becomes easier and more efficient to produce a stream of video data using the at least one virtual camera to provide an appropriate view for the end user.

While described as separate units of the apparatus 3000, one or more of the acquiring unit 3004, the detection unit 3006, the control unit 3008 and the producing unit 3010 may more generally be implemented as circuitry 3002 of the apparatus 3000.

In some examples, the apparatus 3000 may be implemented as part of the apparatus 1000 described with reference to FIG. 1. For example, the circuitry 3002 may be implemented as processing circuitry 1002 described with reference to FIG. 1 of the present disclosure. However, the present disclosure is not particularly limited in this respect.

Furthermore, in examples, the circuitry 3002 may carry out computer instructions stored in a non-transitory computer readable medium.

Further details of embodiments of the present disclosure will now be provided.

<Event Detection Process>

Figure 4:
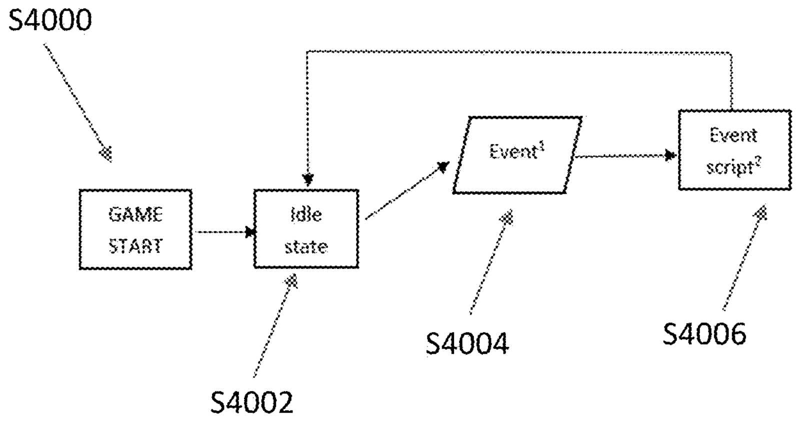
FIG. 4 illustrates an example event detection process in accordance with embodiments of the disclosure.

FIG. 4 illustrates an event detection process in accordance with embodiments of the disclosure. The example event detection is an example of a process as may be performed by the circuitry 3002 of apparatus 3000.

The example of FIG. 4 is described with reference to an example of a sporting event such as a soccer match (such as the soccer match described with reference to FIG. 2 of the present disclosure).

At step S4000 of FIG. 4, the soccer match begins. At this stage a virtual environment is acquired, the virtual environment being output of a simulation of a physical environment. The simulation may be acquired by the acquiring unit 3004 of apparatus 3000. In examples, the virtual environment may be acquired from a virtual environment provider. In examples, the virtual environment may be generated using motion tracking data of the soccer match.

It will be appreciated that in the present disclosure, the virtual environment may be produced by a simulation of a physical environment. In examples, the virtual environment may be a three-dimensional virtual environment, in which a virtual representation of the physical environment is provided. For example, in the soccer match, the virtual environment may be a three-dimensional representation of the soccer match (including, for example, the soccer pitch, the stadium, the fans, the players and objects such as the ball and goal area). The virtual environment will change over time to reflect changes in the physical environment. Therefore, the virtual environment in the present disclosure is not a static model; rather, the virtual environment is a dynamic virtual representation of the physical (real world) environment.

In examples, the circuitry is configured to store the virtual environment in a storage unit as it is received from the virtual environment provider. This enables the circuitry to access the virtual environment as it was in an earlier state (e.g. the soccer match in the virtual environment can be returned to an earlier point in the match).

Furthermore, in examples, the circuitry may use a storage unit as a buffer for the virtual environment as it is received from the virtual provider. In this way, the circuitry may be configured to introduced a predetermined time delay between the stream of video data and the virtual environment as acquired from the virtual environment provider. In some examples, a predetermined time delay such as 10 seconds may be used. However, the predetermined delay is not particularly limited in this respect and may be much longer or much shorter than 10 seconds. Indeed, a predetermined time delay is not required and the apparatus 3000 may process the virtual environment in real time as it is received from the virtual environment provider. If no predetermined time delay is introduced, then the progress of the soccer match in the virtual environment will match (or be in synchronisation with) the progress of the soccer match in the physical environment.

However, if predetermined time delay is introduced, then the state of the soccer match shown in the video stream produced by apparatus 3000 will be behind the state of the soccer match in the physical environment (i.e. in the real world environment). A small predetermined time delay—of say 10 seconds—may be advantageous in a number of situations, as it enables apparatus 3000 to "look-ahead" in the virtual environment received from the virtual environment provider (which is 10 seconds ahead of the video stream produced by apparatus 3000). This means apparatus 3000 may perform certain processing or control (e.g. preselection of a virtual camera or the like) before the "event" occurs in the video stream.

Thus, in examples, the apparatus 3000 may be configured to pre-select a virtual camera in the virtual environment upon detection of the detected event and control the preselected virtual camera in the virtual environment in dependence upon the detected event within the virtual environment when a time corresponding to the predetermined time delay has expired after detection of the detected event. This enables an appropriate virtual camera for a detected event to be pre-selected before the "event" occurs in the video stream. In examples, this may enable the apparatus 3000 to perform appropriate transitions between cameras (since the future camera to be used is pre-selected ahead of time).

However, as noted, a predetermined time delay is not required and the video stream produced by apparatus 3000 may provide a real-time view of the soccer match in the virtual environment which is fully synchronised with the soccer match in the physical environment (i.e. the real world).

At step S4002 of FIG. 4, the process enters a so-called “Idle state”. During this step, the detection unit of apparatus 3006 to detect occurrence of an event in the virtual environment.

The type of event that the detection unit 3006 is configured to detect is not particularly limited. However, in this example (where the virtual environment is a simulation of the soccer match) the event may be a sporting event within the soccer match. For example, the event may include a shot, a goal, an offside, a sending off, a substitution, a foul and/or a pass. Indeed, an event may include any type of action within the virtual environment for which it is desirable that an appropriate view is obtained.

The type of event may depend on the type of event to which embodiments of the disclosure are applied. For example, the events related to a sporting match such as a tennis match may be different that the events related to a soccer match. When the sporting match is a tennis match, the event may include a player serving the ball.

As such, it will be appreciated that the present disclosure is not particularly limited to any specific event. However, it will be understood that an event is a key action which may occur within the virtual environment for which it is desirable that an appropriate view is obtained.

In some examples, a user can decided which event or events they are interested in. This enables the video stream which is produced to be appropriate for a specific users. Indeed, apparatus 3000 may produce different video streams for different users using the simulation which has been acquired. Thus, a user’s enjoyment and appreciation of the sporting match can be increased, as the video stream produced for the user will focus on the types of events that the user is most interested in. This will be described in more detail later with reference to FIG. 6 of the present disclosure.

Until an event is detected by the detection unit 3006 of apparatus 3000, the process may remain in the so-called Idle state and continue monitoring for events. During this time, the video stream may be produced using a default view (corresponding to a default virtual camera, for example). In this example, a default view may include an overhead view of the sporting event. Therefore, until a specific event happens within the virtual environment, the video stream which is produced may use a default view of the virtual environment. Alternatively, in the so-called “Idle state”, a most recently used virtual camera may be used until a further event is detected. Alternatively, in the so-called “Idle state”, the apparatus 3000 may cycle through a number of available virtual cameras to provide the user with different views of the virtual environment until a specific event is detected.

The way in which the detection unit 3006 of apparatus 3000 detects the occurrence of an event within the virtual environment is not particularly limited. Any suitable type of processing may be applied in order to detect events.

In examples, the detection performed by the detection unit 3006 can detect occurrence of an event in the virtual environment by detecting a signal (such as a flag, a message, an instruction or the like) from an external apparatus (such as an external data provider or the like). That is, the external data provider may identify that a certain event occurs (either in the physical environment or in the virtual environment (which is a simulation of the physical environment)). Then, upon identifying the occurrence of the event, the external data provider may generate a signal (such as a flag, a message, an instruction or the like) which is then detected by the detection unit 3006 in order to detect occurrence of the event in the virtual environment.

In examples, the detection unit 3006 can detect occurrence of an event in the virtual environment by monitoring the virtual environment. Monitoring the virtual environment may include monitoring the actual simulation of the physical environment and/or monitoring data underlying the virtual environment (such as the tracking data used in order to generate the virtual environment, for example).

In some examples, a trained model may be used in order to detect the occurrence of events within the virtual environment.

The trained model may, for example, include a machine learning model. In examples, the machine learning model may be a deep learning model. The trained model may be trained in order detect events within the virtual environment. For example, the trained model may be trained to detect events such a player scoring a goal in the soccer match.

Training of the trained model will now be described.

The machine learning model can be trained using either supervised learning or unsupervised learning. In some examples, the machine learning model may, specifically, be a deep learning model which utilizes neural networks.

In supervised learning, labelled data is provided to the machine learning model. That is, data is provided as both an input and a corresponding output (i.e. a “correct answer”). The machine learning model is then trained on this labelled data such that it can be used to predict the output for previously unseen input data.

As a specific example, training a model to detect events may include providing the model with a labelled example of a virtual environment (i.e. data identifying that a specific virtual environment is a simulation corresponding to a player scoring a goal). Training may be performed on historical data (i.e. using previous virtual environments corresponding to previous sporting matches) or synthetic data (i.e. virtual environments generated specifically for the purpose of training the trained model).

Thus, the training data includes both the virtual environment and the “correct answer” (that is, the type of event to which the virtual environment relates).

The training data is not limited to this specific example of training data and different inputs and outputs can be provided in the training data depending on the situation to which the embodiments of the disclosure are to be applied.

The training data, once acquired, is then split into two data sets. These data sets include a training data set and a test data set.

The model (such as a machine learning model) is then trained using the training data set portion of the training data. This enables the model to learn a correspondence between the inputs (i.e. the virtual environment) and the output (i.e. event which is taking place in the virtual environment).

Once trained on the training data set portion of the training data, the performance of the trained model can then be evaluated. That is, the trained model is provided with the (previously unseen) inputs from the test data set and predicts the outputs from these inputs (i.e. feature of the user). The output predicted by the trained model (i.e. the event which takes place) can then be compared with the output from the test data set in order to evaluate the performance of the trained model. Additional training with additional training data (of the same form described above) can then be performed, if required, until satisfactory performance of the trained model on the test data is achieved (i.e. a model which reliably detects events as they occur within the virtual environment).

The present disclosure is not particularly limited to the use of supervised learning when training the trained model. Instead, unsupervised learning can be used to train the trained model. Here, the same training data is provided to the model (e.g. a machine learning model) but the data are not labelled. Instead, the model analyses the data in order to discover patterns in the data to discover the innate structure of the unsalable data. This enables the model to learn for any given inputs (that is, the training data) what corresponding function should be activated.

In this way, a trained model can be acquired which can then be used to detect events as they occur within the virtual environment.

However, it will be appreciated that while a trained model can be used in order to detect events as they occur within the virtual environment, the present disclosure is not particularly limited in this regard. More generally, any suitable processing may be performed in order to detect events as they occur within the virtual environment.

Once an event has been detected by the detection unit 3006 of apparatus 3000, the process moves to step S4004. Here, optionally, the specific type of event which has been detected can be compared against the list of events in which a user is interested. Then, if the event is of interest to the user, the process proceeds to step S4006. However, in some examples, the process will move to step S4006 as soon as an event has been detected by the detection unit 3006.

In step S4006, apparatus 3000 is configured to control at least one virtual camera in the virtual environment in dependence upon a detected event within the virtual environment, wherein each of the at least one virtual cameras captures a different view within the virtual environment. In examples, control of the at least one virtual camera in the virtual environment may include controlling a selection of a virtual camera in order to select a virtual camera which provides a best view of the event which has been detected in the virtual environment. As an example, when the event which has been detected is a player scoring a goal, a virtual camera may be selected which shows a view of the player celebrating after the goal has been scored. In examples, control of the at least one virtual camera may include changing a position and/or orientation of a virtual camera in order to provide a view of the event which has been detected.

Once the at least one virtual camera has been controlled in step S4006, the process may return to the step S4002 (the so-called "Idle state") where apparatus 3000 will continue to monitor for further events within the virtual environment. This process may be repeated in order to provide a stream of video data of the sporting match until the end of the sporting match.

<Event Control Scripts>

In embodiments of the present disclosure, the control of the virtual cameras can be performed in accordance with an event control script (which is a set of instructions to execute when a certain event occurs within the virtual environment). This will now be described in more detail.

Figure 5A:
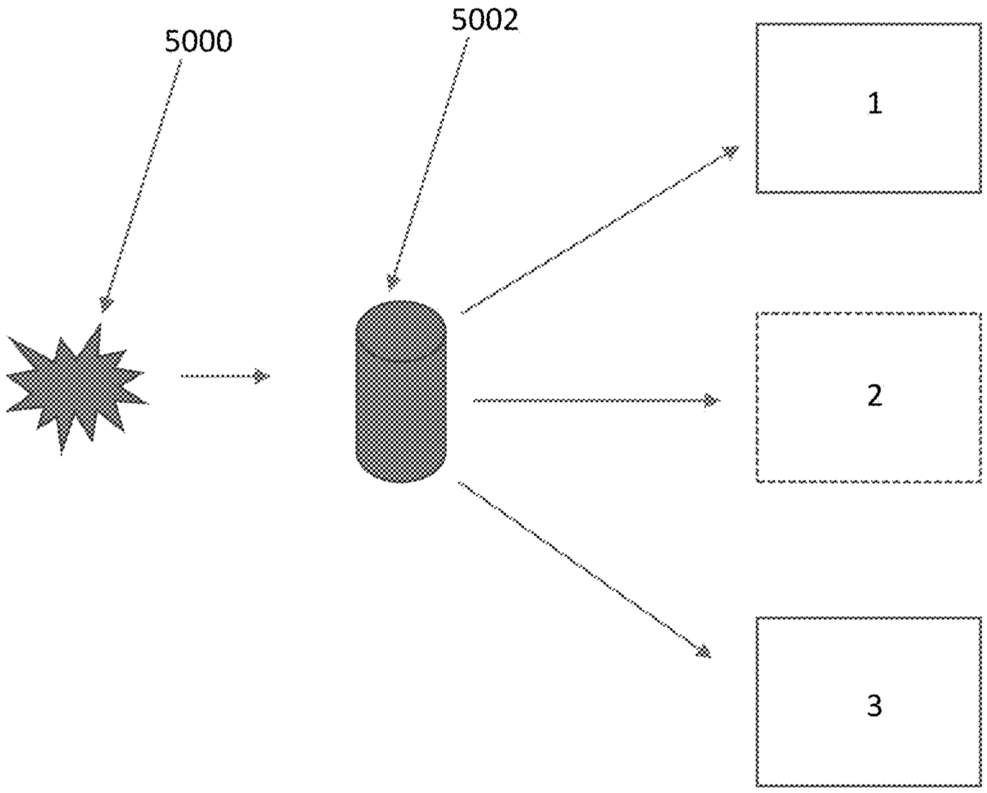
FIG. 5A illustrates an example event detection in accordance with embodiments of the disclosure.

Consider, now, FIG. 5A of the present disclosure. FIG. 5A illustrates an example event detection in accordance with embodiments of the disclosure.

In this example, the occurrence of an event has been detected in a virtual environment. The event may be a player scoring a goal in a soccer match, for example. Then, when the event 5000 has been detected, apparatus 3000 may be configured to retrieve (or otherwise access) an event control script corresponding to the detected event from a storage unit 5002. This corresponds to step S4006 of FIG. 4 of the present disclosure.

That is, in embodiments of the disclosure, the circuitry 3002 of apparatus 3000 (such as control unit 3008 of apparatus 3000) is configured to: select a control script corresponding to the detected event from a selection of control scripts stored in a storage unit, and control the at least one virtual camera using control instructions contained in the control script.

In the example of FIG. 5A, three virtual cameras are provided, each of the virtual cameras providing a different view of the virtual environment. When the control script corresponding to the detected event has been selected and retrieved from the storage unit 5002, apparatus 3000 may control the at least one virtual camera using control instructions contained in the control script. For example, apparatus 3000 may select the second virtual camera as the most appropriate virtual camera to provide a view of the detected event within the virtual environment.

The type of control which is performed by the control unit 3008 of apparatus 3000 on the basis of the event control script is not particularly limited to the selection of a virtual camera as described with reference to FIG. 5A of the present disclosure.

In examples, the control instructions may include instructions defining: a selection of a virtual camera. In examples, the control instructions may include instructions defining a time period for how long a virtual camera should be selected (e.g. how long before a selected virtual camera reverts to a default virtual camera).

In examples, the control instructions may include instruction defining a movement of a virtual camera. The movement of the virtual camera may define a specific movement of the virtual camera (e.g. to capture a view of a specific object within the virtual environment (such as the goal area or a person)). Alternatively, the movement of the virtual camera may define a movement pattern of the virtual camera (such as a spiral pattern) or a movement path along which the virtual camera should move.

In examples, the control instructions may include instructions defining a transition between virtual cameras. For example, when a number virtual cameras are provided at predetermined locations within a virtual environment (each capturing a different view of the virtual environment) the instructions may include an instruction to use a first virtual camera for a period of time before switching to a second virtual camera. Indeed, the instructions may also include instructions defining how the transition between the virtual cameras is to take place. In examples, the transition may include a fade, a push, a cut, a slide or the like between virtual cameras. Alternatively, the transition may define a certain animation which is to be displayed when switching between virtual cameras.

In examples, the control instructions may include instructions to generate a new virtual camera in the virtual environment. Consider an example situation where a number of virtual cameras are provided within a virtual environment (with each of those virtual environments providing a different view of the virtual environment). In some examples, an event may be detected within the virtual environment for which a corresponding virtual camera does not exist. In this situation, the control instructions may define that a new virtual camera should be created at a certain position orientation within the virtual environment to capture the detected event within the virtual environment.

As such, it will be appreciated that the control instructions contained within the control script used by the apparatus are not particularly limited in accordance with embodiments of the disclosure and thus can be used in order to specifically tailor the control of the virtual cameras in the virtual environment in response to the detected event.

Figure 5B:
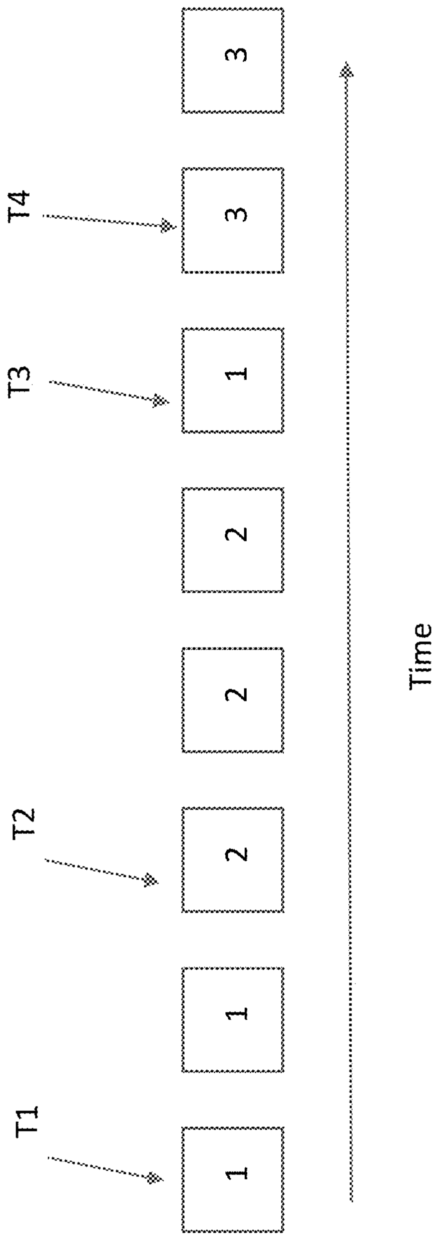
FIG. 5B illustrates an example stream of video data in accordance with embodiments of the disclosure.

Consider, now, FIG. 5B of the present disclosure. FIG. 5B of the present disclosure illustrates an example stream of video data in accordance with embodiments of the disclosure.

The example stream of video data shown in FIG. 5B of the present disclosure provides an example of a stream of video data which may be produced when an event is detected as described in FIG. 5A of the present disclosure. The stream of video data may comprise a series of individual frames of image data captured (using the virtual cameras) at a specific frame rate.

At a first instance of time, T1, the video data is produced using images captured with the first virtual camera in the virtual environment. This time, T1, corresponds to a period of time before an event has been detected in the virtual environment. Therefore, the first virtual camera corresponds to a default virtual camera.

A person watching the video stream which is produced by apparatus 3000 at this time will therefore see a view of the virtual environment as captured by this first virtual camera.

Then, at time T2, an event is detected within the virtual environment (e.g. the event 5000 as described with reference to FIG. 5 of the present disclosure). Accordingly, apparatus 3000 controls the virtual cameras within the virtual environment in dependence upon a detected event within the virtual environment. For example, the control unit may select a control script from a storage corresponding to the detected event. This control script may define that a second virtual camera should be used in order to provide an appropriate view of the detected event. Accordingly, at time T2, the control unit 3008 of apparatus 3000 performs a switch from the first virtual camera to the second virtual camera within the virtual environment.

A person watching the video stream which is produced by apparatus 3000 at this time will therefore see a view of the virtual environment as captured by the second virtual camera.

The second virtual camera may be used for a predetermined time after the event has been detected. Then, at time T3, the control unit 3008 of apparatus 3000 may return to the default camera (i.e. the first virtual camera within the virtual environment).

A person watching the video stream which is produced by apparatus 3000 at this time will therefore see a view of the virtual environment as captured by the first virtual camera.

In this example, at time T4 a second event is then detected within the virtual environment. Accordingly, at time T4, apparatus 3000 controls the virtual cameras within the virtual environment in dependence upon a detected event within the virtual environment. For example, the control unit may select a control script from a storage corresponding to second detected event. This control script may define that a third virtual camera should be used in order to provide an appropriate view of the detected event. Accordingly, at time T4, the control unit 3008 of apparatus 3000 performs a switch from the first virtual camera to the third virtual camera within the virtual environment.

A person watching the video stream which is produced by apparatus 3000 at this time will therefore see a view of the virtual environment as captured by the third virtual camera.

Figure 5C:
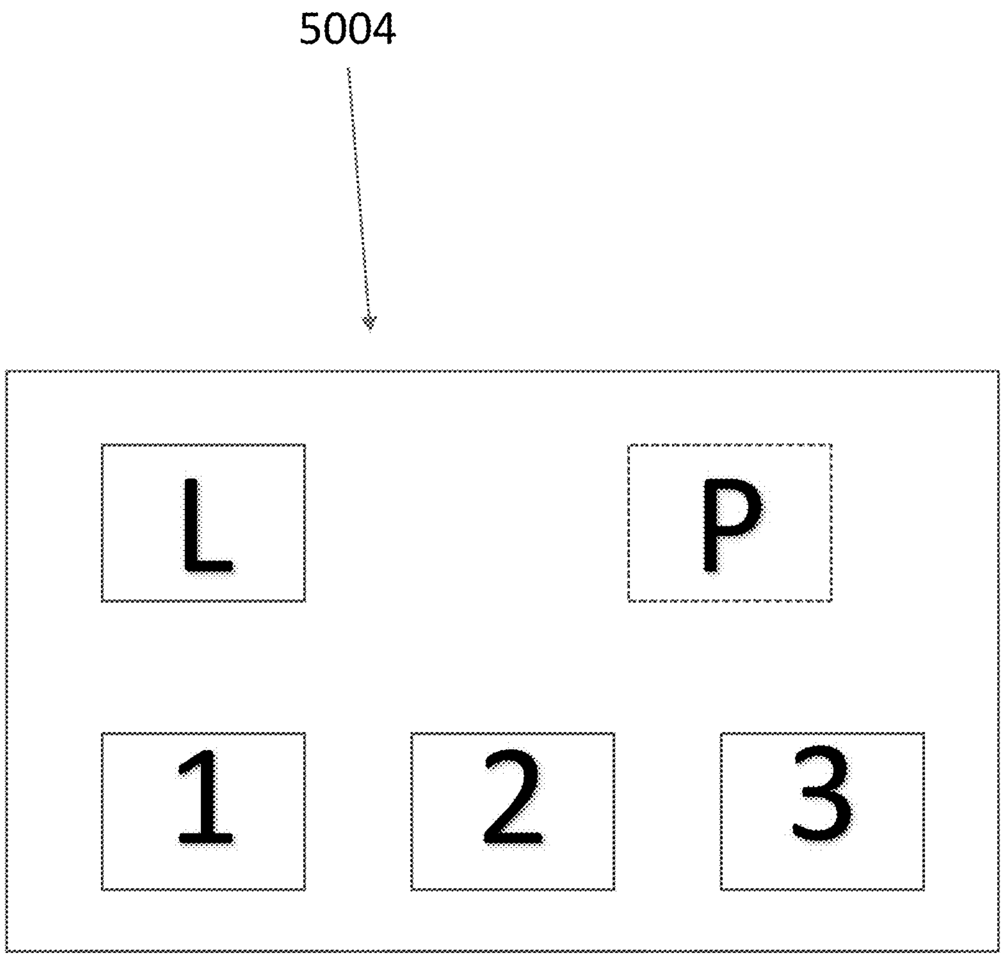
FIG. 5C illustrates an example graphical user interface in accordance with embodiments of the disclosure.

In examples, the video stream which is produced by the apparatus may be provided and displayed using a graphical user interface (GUI). FIG. 5C illustrates an example GUI in accordance with embodiments of the disclosure.

The example GUI 5004 illustrated in FIG. 5C of the present disclosure is an example of a multi-view GUI. Such multi-view GUI may be provided as an output or "broadcast" view and may be used in order for a person (such as a broadcaster) to view the different views of the virtual environment as they are being selected by the apparatus 3000.

The example GUI illustrated in FIG. 5C may be displayed on a display device to the user. The display device may include a screen, a monitor or the like.

In this example, a live view L is provided in a first portion of the display. The so-called live view is a view from the virtual camera which has been selected (or is currently being controlled) by the apparatus 3000. Thus, in examples, the live view shows the video stream which is produced by the apparatus 3000. Therefore, at some instances of time, the live view may show a video stream from camera 1 (e.g. time T1 as described with reference to FIG. 5B). However, at another instance of time, the live view L may show a video stream from a different virtual camera (such as virtual camera 2 at time T2 or virtual camera 3 at time T4 as described with reference to FIG. 5B).

The provision of the live view L enables the person (such as the broadcaster) to see the video stream which is currently being produced by apparatus 3000 at any given instance of time.

In contrast, the display portions 1, 2 and 3 show the view from the virtual cameras 1, 2 and 3 as described with reference to FIGS. 5A and 5B. That is, regardless of the virtual camera which has currently been selected by the apparatus 3000, the view from the virtual cameras 1, 2 and 3 will be displayed on the GUI. Thus, when the virtual camera 2 has been selected by apparatus 3000, the video stream shown in the live view L and the display portion 2 will show the same content. However, even when the virtual camera 2 has been selected (such that the live view L shows the view from virtual camera 2) the display portions 1 and 3 will still show (on the GUI) the view from the virtual cameras 1 and 3.

Thus, even when the apparatus 3000 produces a video stream from a first virtual camera, the person (such as the broadcaster) is able to see the view from the other virtual cameras which have not currently been selected by the apparatus 3000.

In examples, the GUI may also include a display portion P. The display portion P shows a pre-selection of the next virtual camera to be used by apparatus 3000 in order to produce the video stream shown in the live view L. For example, if the live view is currently showing a video stream produced by apparatus 3000 using a view from camera 1, the display portion P may show a view from the virtual camera 2 (if the virtual camera 2 has been preselected by apparatus 3000) or virtual camera 3 (if the virtual camera 3 has been preselected by apparatus 3000). Therefore, even before the change in selection of the virtual camera occurs, the person (such as the broadcaster) can see the view which will be selected by the apparatus 3000 (i.e. the view which has been pre-selected) which will be used to produce the video stream used for the live view L at a later time.

In examples where a predetermined delay has been introduced by apparatus 3000 to the live view (video stream produced by apparatus 3000), the display portion P may show the view of the virtual environment from the pre-selected camera without the predetermined delay. In this way, the broadcaster may view the video stream as will be shown in the live view L before the video stream is shown in the live view L and thus will be able to preview the video which will be used for the live stream ahead of broadcast.

In examples, the virtual cameras may be arranged into ‘modules’, that can be manually (beforehand) or automatically set. A module may include, for example, a ‘look at target’ module (look at the ball, for example), a ‘follow target’ module (follow a player in space, for example), and/or a ‘position clamp’ module (stay within certain boundaries in the virtual environment, for example).

These modules may also be assigned via a GUI by the broadcaster. This improves control of the broadcaster over the content related to each of the virtual cameras in the virtual environment.

It will be appreciated that the present disclosure is not particularly limited to the example described with reference to FIGS. 5A, 5B and 5C of the present disclosure. For example, the number of virtual cameras available within the virtual environment may be significantly more than the virtual cameras described in this example. Alternatively, there may be only a single virtual camera within the virtual environment, with the single virtual camera being controlled by apparatus 3000 in dependence upon the detected event.

The format of the video data produced by apparatus 3000 is not particularly limited. In some examples, apparatus 3000 may produce a high definition stream of video data. Alternatively, in some examples, apparatus 3000 may produce ultra-high definition video (such as 4K video or the like). In some examples, the stream of video data produced by apparatus 3000 may be recorded in a storage unit for later retrieval. In some examples, the stream of video data produced by apparatus 3000 may be communicated using any suitable wired or wireless communication to a user. For example, the stream of video data may be provided directly to a user over a network such as the internet. Then, a user can watch the stream of video data using a display device (such as a television or a computing device). The user may then watch the sporting match in the virtual environment in real time as it takes place in the real world (physical environment), with an appropriate view. In some examples, the apparatus 3000 may be on a client-side. In these examples, the apparatus 3000 may directly render the stream of video data which has been produced on a screen or other type of display device on the client-side. In examples, the stream of video data which has been produced may be rendered directly by apparatus 3000 using a screen or other type of display device which forms a part of the apparatus 3000.

In this way, apparatus 3000 performs a function of an automated director, which can produce live video streams of the sporting event with an appropriate in the virtual environment. As control of the virtual cameras is performed by apparatus 3000 in response to detection of an event or events within the virtual environment, an appropriate view of the virtual environment can be produced more easily and efficiently. For example, as described above, apparatus 3000 may automatically trigger virtual camera switches or movement patterns in order to provide a user with an appropriate view within the virtual environment.

Furthermore, in some examples, the control of the virtual cameras within the virtual environment as performed by apparatus 3000 may be specific to an individual user or group of users. Therefore, apparatus 3000 may be configured to produce a different stream of video data of the sporting match for different users, such that each user can receive a personalised stream of video data tailored to the types of events within the sporting event that the user is most interested in watching.

This will be described in more detail with reference to FIG. 6 of the present disclosure.

Figure 6:
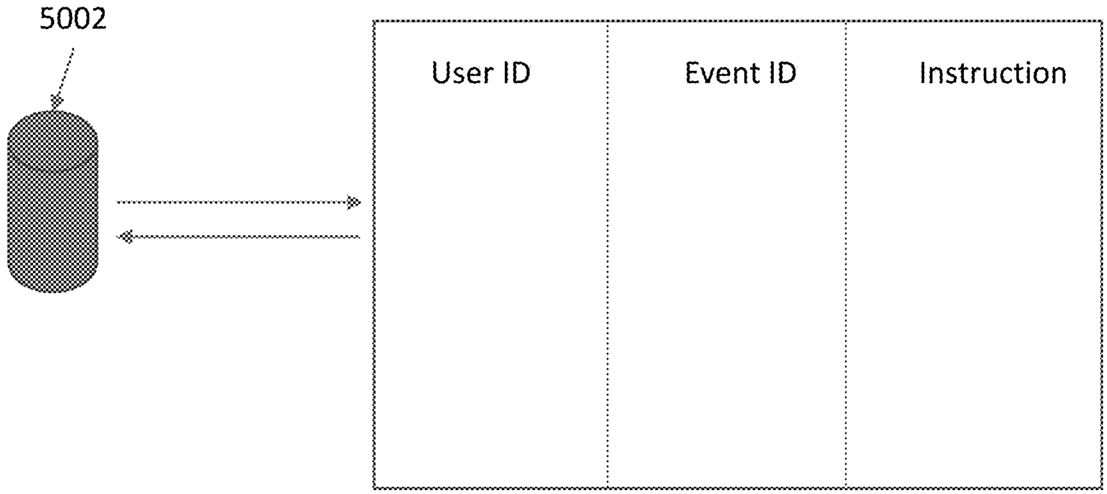
FIG. 6 illustrates an example storage unit in accordance with embodiments of the disclosure.

FIG. 6 illustrates an example storage unit in accordance with embodiments of the disclosure.

The storage unit 5002 as illustrated in FIG. 6 of the present disclosure may be integrated into the apparatus 3000 or may be separate to the apparatus 3000 and connected thereto using either a wired or wireless connection.

In some examples, the apparatus 3000 and/or the storage unit 5002 may be located in a server.

The storage unit 5002 is used in order to store event control scripts. The event control scripts may include control instructions which can be used by apparatus 3000 in order to control at least one virtual camera within the virtual environment.

In this example, the control instructions are stored in association with a user ID and an Event ID.

The user ID is information which identifies a specific user (or group of users). In examples, the user ID may be the user's name. Alternatively, the user ID may be an identification number. Indeed, the type of information used as the user ID is not particularly limited and any suitable information which identifies a specific user or group of users can be used as required.

The user ID may be provided by a user during a registration process. During this registration process, the user may indicate the type of events they are interested in viewing during the sporting match. For example, the user may indicate that they would like to see events associated with a specific player. Alternatively, the user may indicate that they would like to see events of a specific type (such as a pass or a goal). Each type of event may be identified by an Event ID. As described for the User ID, the Event ID is not particularly limited and any suitable information which identifies a specific event (or group of events) may be used as required.

Each user may then define, for a specific Event ID, an instruction or set of instructions which are to be used in order to control the virtual cameras within the virtual environment when that specific event is detected. For example, a user may define that a specific virtual camera is to be used when an event is detected (such as an overhead camera or a "close up" camera). Alternatively, a user may define that a specific movement pattern is to be performed when an event is detected (e.g. move the virtual camera in order to follow the player who has scored the goal).

In this way, different users can define different instructions to be performed for the same event when that event is detected to occur within the virtual environment. Alternatively, different users can define different events that they are interested in watching when they occur in the virtual environment.

In some examples, if a user is not interested in watching a certain event when it occurs in the virtual environment (such as a substitution of a player) apparatus 3000 may provide that user with a default view of the virtual environment (such as an overhead view of the sporting match) while that event is taking place.

As such, in embodiments of the disclosure, the storage unit stores different control scripts for different users and the circuitry is configured: to receive user identification to identify a user, and wherein in order to control the at least one virtual camera, the circuitry is configured to select a control script corresponding to the detected event and the identified user from a selection of control scripts storage unit, and control the at least one virtual camera using control instructions contained in the control script.

This enables different video streams to be provided to different users, with each user receiving a video stream comprising a view of the events within the sporting environment which are most appropriate for that user.

In some examples, the circuitry may be configured to enable a user to edit control instructions contained in a control script. A user may provide instruction to edit a control instruction in the control script (such as the control instructions for a specific event) using a user input device. The user input device may be a touch screen or may be a mouse or stylist type input device. The user input device 1006 may also be a keyboard or any combination of these devices. In examples, the user input device may be a microphone (enabling the user to provide "voice instructions").

In examples, circuitry 3000 may provide the user with a Graphical User Interface which can be used in order to edit the control instructions. In examples, the user may be edit the control instructions in real time during a sporting event, to change how subsequent events are processed by the apparatus 3000.

In examples, a user may provide multiple different scripts for a specific event. Alternatively, multiple events may be detected at the same time within the sporting environment. In these cases, the circuitry may be configured to execute the control scripts in accordance with a priority level of the control scripts. For example, a specific type of event may take priority over a different type of event. Alternatively, a user may indicate a level of priority for different scrips (or control instructions) for a detected event.

In examples, the circuitry of apparatus 3000 may be configured to execute the script with the highest priority level. Alternatively, in examples, the circuitry of apparatus 3000 the multiple control scripts in a sequence starting with the script with the highest priority level. However, different ways of executing the scripts in accordance with the priority of those scripts may be provided depending on the situation to which the embodiments of the present disclosure are applied.

As the control of the virtual cameras is performed in accordance with a priority level of the control script, the user will receive a stream of video with an appropriate view of the virtual environment (showing the events that are most important to the user) even when multiple events occur at the same time (or multiple control instructions exist for the detected event).

<Replay Events>

As explained, in embodiments of the present disclosure, apparatus 3000 produces a function of an automated director, which can produce live video streams of the sporting event with an appropriate view in the virtual environment. That is, as the occurrence of an event, or set of events, is detected, apparatus 3000 may perform control of the virtual cameras in order to provide an appropriate view of the event in the video stream which is produced. This may be repeated for the duration of the sporting event, for example.

However, it will be appreciated that for some physical environments, there may be certain times when there is an interruption. During such an interruption, no further events within the physical environment may occur. Taking a sporting match as an example, an interruption to the sporting match may take place at a certain point within the match (such as half way through the sporting match). Alternatively, interruptions may take place at random points within the match. For example, a soccer match may be interrupted if the ball goes out of play, or if a player commits a foul (breaking a rule of the soccer match), or if a player is injured, or if a player scores a goal, or if a player is substituted, for example. During this time, a person viewing the video stream produced by apparatus 3000 may become bored or disinterested. Furthermore, there may even be an interruption in the flow of the simulation and thus the flow of the virtual environment received from the virtual environment. This may cause a break or blank period in the video stream which is produced.

As such, in embodiments of the disclosure, the detection unit 3006 of apparatus 3000 may be further configured to monitor the virtual environment for such an interruption and perform control of the virtual cameras to provide a replay of an earlier event to the user. This may keep the user interested even during an interruption and prevents blank periods in the video stream which is produced. Thus, a stream of video data containing an appropriate view of a virtual environment can be produced more easily and efficiently.

Figure 7:
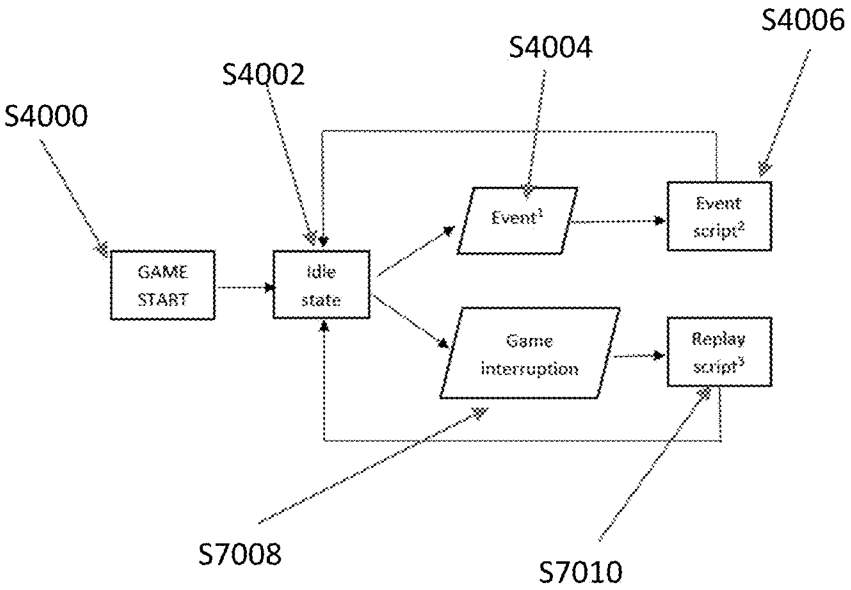
FIG. 7 illustrates an example event detection process in accordance with embodiments of the disclosure.

Consider, now, FIG. 7 of the present disclosure. FIG. 7 illustrates an example event detection process in accordance with embodiments of the disclosure.

The example of FIG. 7 is described with reference to an example of a sporting event such as a soccer match (such as the soccer match described with reference to FIG. 2 of the present disclosure).

Furthermore, the steps S4000, S4002, S4004 and S4006 of FIG. 7 are, in general, the same as the steps S4000, S4002, S4004 and S4006 as have been described with reference to FIG. 4 of the present disclosure. Therefore, as far as these steps are the same as described with reference to FIG. 4, further description of these steps will not be provided at this stage for brevity of the disclosure.

However, it will be appreciated that during step S4002 (the so-called "Idle state"), the circuitry may be further configured to detect an interruption in the virtual environment.

The way in which the circuitry is configured to detect an interruption is not particularly limited and may vary in dependence on the type of situation to which the embodiments are applied, the type of interruption which is to be detected and the like. For example, in some examples (such as a soccer match) the detection unit 3006 of apparatus 3000 may be configured to detect an interruption in the match in accordance with an action taking by a particular person within the virtual environment. For example, an action taking by a referee (such as an arm signal or the like) may indicate an interruption. This may occur, for example, if the referee considers that a player has broken a rule (such a committing a foul).

In other situations, the position or location of an object within the virtual environment may indicate an interruption. For example, if the ball leaves the pitch (such as when it is kicked out of play by a player) then an interruption may take place.

In other situations, detection of an event within the environment may indicate that an interruption will take place. For example, detection of an event (such as a goal) may indicate that there will be an interruption before the sporting event resumes. In these cases, the circuitry may be configured to detect the interruption (and thus perform a suitable replay of an earlier event) once any control associated with the specific event has taken place (e.g. once the instructions contained in the event control script have been executed).

In examples, a trained model may be used in order to detect interruptions in the virtual environment. The trained model to detect the interruption may be trained in the same way as described for a trained model to detect the occurrence of events within the virtual environment. Indeed, as noted above, in some examples, an interruption may be considered a specific type of event within the virtual environment. Therefore, the trained model may be trained in the same way as previously described. However, the training data used to train the trained model may differ from the training data used to train the trained model for the detection of the occurrence of events within the virtual environment. That is, the training data used to train the trained model should include examples of a virtual environment where an interruption takes place. This can be labelled or unlabelled depending on the type of trained model. The trained model can then be trained on this training data as described above in order to produce a trained model configured to detect interruptions in the virtual environment.

However, it will be appreciated that while a trained model can be used in order to detect interruptions in the virtual environment, the present disclosure is not particularly limited in this regard. More generally, any suitable processing may be performed in order to detect interruptions within the virtual environment. In examples, the detection of interruptions (or other events) in the virtual environment is based on detection of interruptions (or other events) in the tracking data which is used in order to locate people (such as players) and objects (such as balls) and position them within the virtual environment.

Once an interruption has been detected by the detection unit 3006 of apparatus 3000, the process moves to step S7008. Here, optionally, the specific type of interruption which has been detected can be reviewed. For example, if the type of game interruption which has been detected has a corresponding event (such as a goal being scored by a player in the soccer match) then the processing may wait until the control associated with that event has been performed. In other examples, the processing may proceed directly to S7010.

In step S7010, circuitry of apparatus 3000 (such as control unit 3008) may be configured to control at least one virtual camera in the virtual environment in dependence upon a previously detected event within the virtual environment, and produce a stream of video data of the virtual environment using the at least one virtual cameras. For example, apparatus 3000 may be configured to control select a previous event which has been detected in the virtual environment (such as a the most recently occurring event within the virtual environment before the interruption) and may control the virtual cameras to acquire a view of this previously occurring event in the virtual environment (e.g. by accessing the state of the virtual environment at the time at which the previously occurring event occurred, and controlling the virtual camera to capture a view of this previously occurring event). In this way, the video produced by apparatus 3000 may show a replay of the previously occurring event in the virtual environment while the interruption takes place.

In examples, the replay may continue to be shown until the end of the interruption. If the replay ends before the interruption ends, then an additional replay may be shown (or the replay may be repeated). Furthermore, if the interruption ends (and the play resumes) before the replay ends, the process may end the replay and return to step S4002 (the so-called “Idle state”) where the detection unit of apparatus 3000 will monitor for further events of interruptions.

In some examples (such as where a predetermined delay is introduced as described hereinbefore) then apparatus 3000 may identify that the interruption has ended (in the virtual environment received in real time from the virtual event provider) while the replay is still taking place in the video stream provided to the end user. This may enable apparatus 3000 to select a replay of an appropriate length (or an appropriate time to end the replay) during the predetermined delay before returning to step S4002.

This process of FIG. 7 may then be repeated in order to provide a stream of video data of the sporting match until the end of the sporting match.

In some examples, apparatus 3000 may further be configured in order to produce a stream of video data of the sporting match as so-called highlights (or a highlight-reel). In examples, the highlights may be produced after the end of the sporting match. In examples, the highlights may be produced during an interval of the sporting match-such as half time. In examples, the highlight reel may be produced during the sporting event (as the sporting event progresses); the highlight reel may then be continually updated as the sporting event progresses. A person who starts watching the sporting event after the start of the sporting event may elect to view the highlights of the sporting event so far, in order to catch up with any action in the sporting event they have missed, for example. After this time, they may proceed to view the stream of video data described with reference to FIG. 7 of the present disclosure, for example (i.e. a “live view” stream). Therefore, the time at which the highlights are produced by the apparatus 3000 is not particularly limited.

Thus, a stream of video data may be produced as highlights of the sporting event (e.g. to show or recap important events which occurred during the sporting event). The video stream produced by apparatus 3000 to create the highlights may be produced in the same way as the video stream produced for the live view and the video stream produced for the replays. Indeed, in some examples, the highlights of the sporting event may include a compilation of the replays shown during the sporting event.

In some examples, a number of additional factors may be used by apparatus 3000 in order to construct the highlights. That is, in some examples, priority information assigned to the event or events which have been detected in the virtual environment may be used in order to select events or an order of events which are to be shown in the highlights of the sporting event. The priority information may be predetermined priority information corresponding to a type of event. That is, for example, an event of a first type (e.g. a goal) may have a higher priority than an event of a second type (e.g. a substitution). However, in other examples, the priority information may be assigned individually to the event (e.g. a first shot on goal may have a higher priority than a second shot on goal, if the second shot on goal had less chance of resulting in a goal). In examples, the priority information assigned individually to the events may be assigned by a broadcaster or an external data provider, for example.

Thus, the priority information can be used by apparatus 3000 in order to decide on what replays/events to include/exclude from the highlight video stream. Also, a length of the highlights can be defined (or predefined) by a user input (such as an end user, a broadcaster or the like). In contrast to replays, there is no time restriction on the length of the highlights (since the highlights are not dependent on stoppage duration). As such, in examples, the length of the highlights may also be used by apparatus 3000 to determine what replays/events to include/exclude from the highlight reel (e.g. only include lower priority events in the highlights if time remains after all the higher priority events have been shown).

As such, in examples, apparatus 3000 may be configured to assign a priority to previously detected events in the virtual environment and control at least one virtual camera in the virtual environment in dependence upon the priority assigned to previously detected events within the virtual environment, and produce a stream of video data of the virtual environment using the at least one virtual camera.

Therefore, in embodiments of the disclosure, the apparatus 3000 may be configured to detect an interruption in the virtual environment, control at least one virtual camera in the virtual environment in dependence upon a previously detected event within the virtual environment, and produce a stream of video data of the virtual environment using the at least one virtual cameras.

<Replay Control Scripts>

In embodiments of the present disclosure, the control of the virtual cameras can be performed in accordance with a replay control script (which is a set of instructions to execute when a certain interruption occurs within the virtual environment). This will now be described in more detail.

A replay control script for a given interruption may be stored in a storage unit (such as storage unit 5002 as described to reference to FIGS. 5 and 6 of the present disclosure). Then, when an interruption in the virtual environment has been detected, apparatus 3000 may be configured to retrieve (or otherwise access) an interruption scrip corresponding to the detected interruption from the storage unit 5002.

That is, in embodiments of the disclosure, in order to control the at least one virtual camera in accordance with the previously detected event, the circuitry is configured to: select a replay control script corresponding to the previously detected event from a selection of replay control scripts stored in a storage unit, and control the at least one virtual camera using control instructions contained in the replay control script.

In contrast to an event script (which can be executed without interrupting the flow of the virtual environment) a replay control script will interrupt the flow of the virtual environment. That is, the replay control script will rewind the virtual environment to an earlier time (corresponding to a time at which a previously detected event occurred) in order to control the virtual cameras to provide an appropriate view of the previously detected event.

It will be appreciated that the view of the virtual environment provided during the replay may be different that the view of the virtual environment originally provided when the previously detected event previously occurred. That is, since the virtual environment can be rewound, the virtual cameras can be controlled by apparatus 3000 to capture a same view or a different view of a previously detected event.

A replay script contains all the actions to perform while playing a replay for a specific event. In examples, the replay scripts may be specific to a specific user. In these examples, the user may configure one (or more) replay script for each event they want shown inside a replay.

An action (or control instruction) contained within a replay script is not particularly limited. However, an action (or control instruction) may comprise a selection of which camera to use (from a set of virtual cameras).

Alternatively or in addition an action (or control instruction) may comprise an instruction of which speed to play the replay (e.g. slow motion, normal speed, high speed). Playing the replay at a different speed to the original event may enable the user to appreciate an aspect of the event which they previously did not appreciate.

Alternatively or in addition, an action (or control instruction) may comprises instruction concerning when the replay should start (e.g. 1 second before/after the event happens).

Alternatively or in addition, an action (or instruction) may define an order in which previously detected events should be replayed (e.g. a replay can be played at the start of the reel, in the middle, at the end, etc.). Indeed, in some examples, when there are multiple different events, a previously detected event may be selected for a replay in accordance with one or more of: which previously detected event (or category of detected event) has more priority (e.g. a goal, a shot, an offside, or the like—in the example of a sporting match) a replay strategy (e.g. a number of replays to be shown per interruption an order of the previously detected events (e.g. whether to show the previously detected events in the order the events happened during the match, in a custom order, or the like).

More generally, in embodiments of the disclosure, the control instructions of the replay control scripts include instructions defining: a selection of a virtual camera, a time period for how long a virtual camera should be selected, a movement of a virtual camera, a transition between virtual cameras, instructions to generate a new virtual camera in the virtual environment, a playback speed for a virtual camera, and/or a portion of the previously detected event for which a virtual camera should be selected.

When different replay scripts are provided for different users, a user may be able to edit control instructions contained in a replay control script. This may be performed in the same way as described for editing control instruction in an event control script as described hereinbefore.

Once the virtual cameras have been controlled in accordance with the selected replay control script, the apparatus 3000 may be configured to produce a stream of video data using the at least one virtual cameras controlled in dependence upon a previously detected event within the virtual environment for a duration of the interruption.

Figure 8:
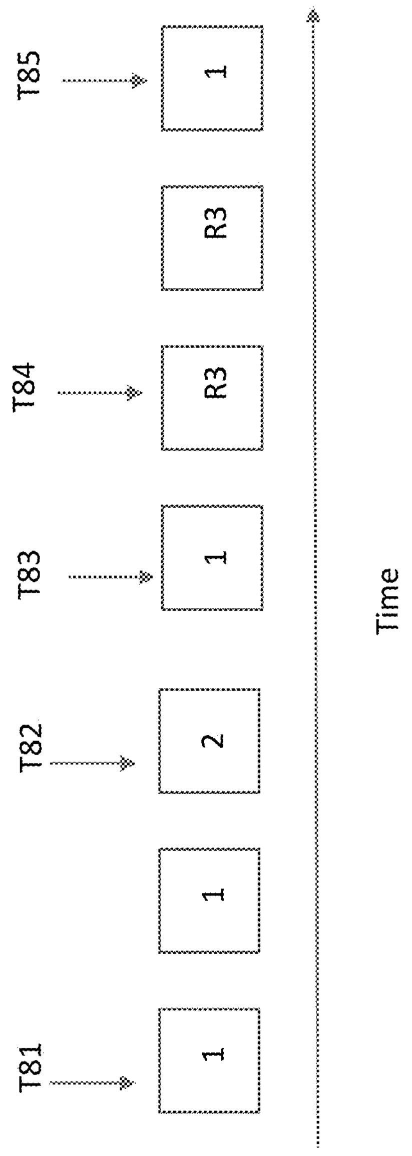
FIG. 8 illustrates an example stream of video data in accordance with embodiments of the disclosure.

Consider, now FIG. 8 of the present disclosure. FIG. 8 of the present disclosure illustrates an example stream of video data in accordance with embodiments of the disclosure.

The example stream of video data shown in FIG. 8 of the present disclosure provides an example of a stream of video data which may be produced when an interruption is detected in the virtual environment. The stream of video data may comprise a series of individual frames of image data captured (using the virtual cameras) at a specific frame rate.

At a first instance of time, T81, the video data is produced using images captured with the first virtual camera in the virtual environment. This time, T81, corresponds to a period of time before an event has been detected in the virtual environment. Therefore, the first virtual camera corresponds to a default virtual camera.

A person watching the video stream which is produced by apparatus 3000 at this time will therefore see a view of the virtual environment as captured by this first virtual camera.

Then, at time T82, an event is detected within the virtual environment (e.g. a player scores a goal within the soccer match). Accordingly, apparatus 3000 controls the virtual cameras within the virtual environment in dependence upon the detected event within the virtual environment. For example, the control unit may select an event control script from a storage corresponding to the detected event. This control script may define that a second virtual camera should be used in order to provide an appropriate view of the detected event (that is, the goal). Accordingly, at time T82, the control unit 3008 of apparatus 3000 performs a switch from the first virtual camera to the second virtual camera within the virtual environment.

A person watching the video stream which is produced by apparatus 3000 at this time will therefore see a view of the virtual environment as captured by the second virtual camera.

The second virtual camera may be used for a predetermined time after the event has been detected. Then, at time T83, the control unit 3008 of apparatus 3000 may return to the default camera (i.e. the first virtual camera within the virtual environment).

A person watching the video stream which is produced by apparatus 3000 at this time will therefore see a view of the virtual environment as captured by the first virtual camera.

Then, at a later time T84, an interruption is detected within the virtual environment. This may be, for example, a player being injured during the soccer match. As a result of the injury to the player, an interruption in the virtual environment occurs an is detected by detection unit 3006 of apparatus 3000. Accordingly, apparatus 3000 controls the virtual cameras within the virtual environment in dependence upon the detected interruption within the virtual environment. For example, the control unit may select a replay control script from the storage corresponding to the detected interruption for the user. This control script may define that during an interruption caused by the injury of a player, the previously detected event should be replayed. Furthermore, the control script may define that the previously detected event should be replayed using a different virtual camera than used for the original event (to show a different angle of the event) and at a slower speed (e.g. slow motion). Accordingly, at time T84, the control unit 3008 of apparatus 3000 performs a switch from the first virtual camera to a third virtual camera (indicated R3) which captures a view of the previously detected event (the goal scored by the player) once the virtual environment has been rewound to the earlier time corresponding to the time at which the previously detected event occurred.

A person watching the video stream which is produced by apparatus 3000 at this time will therefore see a replay of the previously detected event (i.e. the player scoring the goal) from a different virtual camera (virtual camera 3) at a different speed (slow motion).

Then, once the play resumes (or when the replay ends) the virtual camera is controlled to return to the default camera (the first virtual camera) in a live view of the virtual event (i.e. with the virtual event returned to the current time).

It will be appreciated that the present disclosure is not particularly limited to the example described with reference to FIG. 8 of the present disclosure. For example, the number of virtual cameras available within the virtual environment may be significantly more than the virtual cameras described in this example. Alternatively, there may be only a single virtual camera within the virtual environment, with the single virtual camera being controlled by apparatus 3000 accordingly.

The format of the video data produced by apparatus 3000 is not particularly limited. In some examples, apparatus 3000 may produce a high definition stream of video data. Alternatively, in some examples, apparatus 3000 may produce ultra-high definition video (such as 4K video or the like). In some examples, the stream of video data produced by apparatus 3000 may be recorded in a storage unit for later retrieval. In some examples, the stream of video data produced by apparatus 3000 may be communicated using any suitable wired or wireless communication to a user. For example, the stream of video data may be provided directly to a user over a network such as the internet. Then, a user can watch the stream of video data using a display device (such as a television or a computing device). The user may then watch the sporting match in the virtual environment in real time as it takes place in the real world (physical environment), with an appropriate view.

Furthermore, when an interruption occurs within the virtual environment, a replay may be displayed to the user in order that the user may be kept interested even during the interruption. Furthermore, this prevents blank periods in the video stream which is produced (e.g. if the virtual environment itself is interrupted). Thus, a stream of video data containing an appropriate view of a virtual environment can be produced more easily and efficiently.

In this way, apparatus 3000 performs a function of an automated director, which can produce live or replay video streams of the sporting event with an appropriate in the virtual environment. As control of the virtual cameras is performed by apparatus 3000 in response to detection of an event or interruption within the virtual environment, an appropriate view of the virtual environment can be produced more easily and efficiently.

Furthermore, in some examples, the control of the virtual cameras within the virtual environment as performed by apparatus 3000 may be specific to an individual user or group of users. Therefore, apparatus 3000 may be configured to produce a different stream of video data of the sporting match for different users-even during interruptions of the virtual event-such that each user can receive a personalised stream of video data tailored to the types of events within the sporting event that the user is most interested in watching (for both live stream and replays within the live stream).

Advantageous Technical Effect

Thus, in accordance with embodiments of the disclosure, a stream of video data (such as a live stream of video data) containing an appropriate view of a simulation can be produced more easily and efficiently.

It will be appreciated that the present disclosure is not particularly limited to these advantageous technical effects. Other technical effects will become apparent to the skilled person when reading the disclosure.

Method

Figure 9:
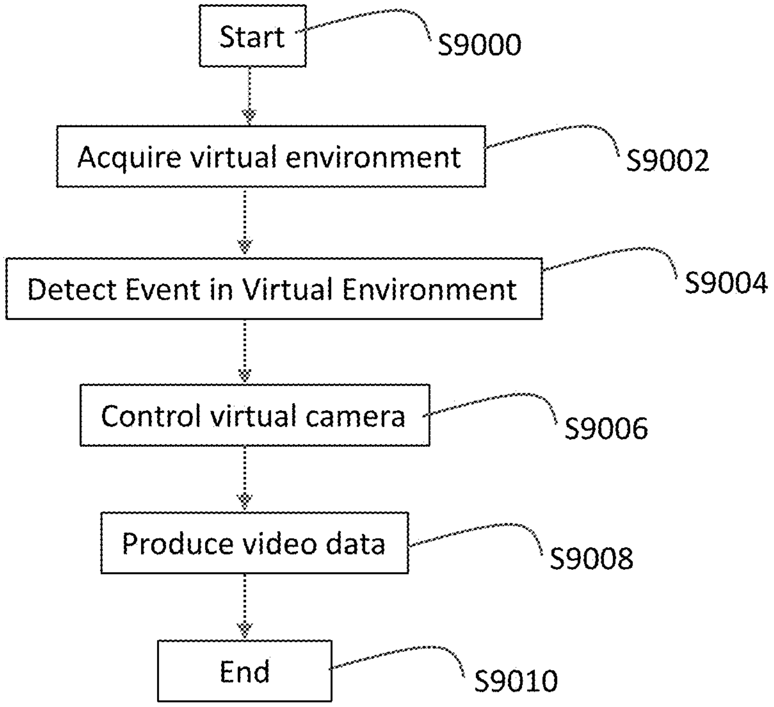
FIG. 9 illustrates an example method in accordance with embodiments of the disclosure.

Hence more generally a method of producing a stream of video data of a virtual environment is provided in accordance with embodiments of the disclosure. FIG. 9 illustrates an example method in accordance with embodiments of the disclosure.

The example method of FIG. 9 of the present disclosure may be performed by an apparatus such as apparatus 1000 or apparatus 3000 as described with reference to FIGS. 1 and 3 of the present disclosure respectively.

The example method of FIG. 9 starts at step S9000 and proceeds to step S9002.

In step S9002, the method comprises receiving a virtual environment from a virtual environment provider, the virtual environment being output of a simulation of a physical environment.

In step S9004, the method comprises detecting occurrence of an event in the virtual environment.

Then, in step S9006, the method comprises controlling at least one virtual camera in the virtual environment in dependence upon a detected event within the virtual environment, wherein each of the at least one virtual cameras captures a different view within the virtual environment.

In step S9008, the method comprises producing a stream of video data of the virtual environment using the at least one virtual cameras.

The method then proceeds to, and ends with, step S9010.

It will be appreciated that the present disclosure is not specifically limited to the example method illustrated in FIG. 9 of the present disclosure. For example, a number of steps of the method may be performed in a different order than illustrated in FIG. 9. In examples, a number of the different steps of the method may be repeated. In examples, a number of the different method steps may be performed in parallel. In examples, one or more additional steps may also be included in the method.

CLAUSES

In addition, technical features and aspects of the present disclosure may further be arranged in accordance with the following numbered clauses:

1. An apparatus for producing a stream of video data of a virtual environment, the apparatus comprising circuitry configured to:
   - acquire a virtual environment, the virtual environment being output of a simulation of a physical environment;
   - detect occurrence of an event in the virtual environment;
   - control at least one virtual camera in the virtual environment in dependence upon a detected event within the virtual environment, wherein the at least one virtual camera captures a view within the virtual environment; and
   - produce a stream of video data of the virtual environment using the at least one virtual camera.
2. The apparatus according to clause 1, wherein the physical environment is a sporting match.
3. The apparatus according to clause 1 or 2, wherein the sporting match is one of a soccer match, a tennis match, a rugby match or an ice-hockey match.
4. The apparatus according to clause 2 or 3, wherein the event is an event in the sporting match comprising at least one of: a shot, a goal, an offside, a sending off, a substitution, a foul and/or a pass.
5. The apparatus according to any preceding clause, wherein when the at least one virtual camera comprises a plurality of virtual cameras, each of the plurality of virtual cameras captures a different view within the virtual environment.
6. The apparatus according to any preceding clause, wherein in order to control the at least one virtual camera in accordance with the detected event, the circuitry is configured to: select a control script corresponding to the detected event from a selection of control scripts stored in a storage unit, and control the at least one virtual camera using control instructions contained in the control script.
7. The apparatus according to clause 6, wherein the control instructions include instructions defining: a selection of a virtual camera, a time period for how long a virtual camera should be selected, a movement of a virtual camera, a transition between virtual cameras and/or instructions to generate a new virtual camera in the virtual environment.
8. The apparatus according to clause 6 or 7, wherein the storage unit stores different control scripts for different users and wherein the circuitry is configured: to receive user identification to identify a user, and wherein in order to control the at least one virtual camera, the circuitry is configured to select a control script corresponding to the detected event and the identified user from a selection of control scripts storage unit, and control the at least one virtual camera using control instructions contained in the control script.
9. The apparatus according to clause 8, wherein the circuitry is configured to enable a user to edit control instructions contained in a control script.
10. The apparatus according to any of clauses 6 to 9, wherein when multiple control scripts exist for the detected event, the circuitry is configured to execute the control scripts in accordance with a priority level of the control scripts.
11. The apparatus according to clause 10, wherein the circuitry is configured to execute the script with the highest priority level.
12. The apparatus according to clause 10, wherein the circuitry is configured to execute the multiple control scripts in a sequence starting with the script with the highest priority level.
13. The apparatus according to any preceding clause, wherein the circuitry is configured to acquire the virtual environment from a virtual environment provider.
14. The apparatus according to clause 13, wherein the circuitry is configured to store the virtual environment in a storage unit as it is received from the virtual environment provider.
15. The apparatus according to clause 14, wherein the circuitry is configured to introduce a predetermined time delay between the stream of video data and the virtual environment as acquired from the virtual environment provider.
16. The apparatus according to clause 14, wherein the circuitry is configured to pre-select a virtual camera in the virtual environment upon detection of the detected event and control the pre-selected virtual camera in the virtual environment in dependence upon the detected event within the virtual environment when a time corresponding to the predetermined time delay has expired after detection of the detected event.
17. The apparatus according to any preceding clause, wherein the circuitry is further configured to: detect an interruption in the virtual environment, control at least one virtual camera in the virtual environment in dependence upon a previously detected event within the virtual environment, and produce a stream of video data of the virtual environment using the at least one virtual camera.
18. The apparatus according to clause 17, wherein the physical environment is a sporting match and wherein the interruption is an interruption of the sporting match.
19. The apparatus according to clause 17 or 18, wherein in order to control the at least one virtual camera in accordance with the previously detected event, the circuitry is configured to: select a replay control script corresponding to the previously detected event from a selection of replay control scripts stored in a storage unit, and control the at least one virtual camera using control instructions contained in the replay control script.
20. The apparatus according to any of clauses 17 to 19, when a plurality of events have been previously detected, the circuitry is configured to select one or more previously detected events from the plurality of previously detected events in accordance with at least one of: a priority level of each of the plurality of previously detected events, an order of each of the plurality of previously detected events, a maximum number of previously detected events which can be selected and/or a category of each of the plurality of previously detected events.

21. The apparatus according to any of clauses 17 to 20, wherein the control instructions of the replay control scripts include instructions defining: a selection of a virtual camera, a time period for how long a virtual camera should be selected, a movement of a virtual camera, a transition between virtual cameras, instructions to generate a new virtual camera in the virtual environment, a playback speed for a virtual camera, and/or a portion of the previously detected event for which a virtual camera should be selected.

22. The apparatus according to any of clauses 19 to 21, wherein the storage unit stores different replay control scripts for different users and wherein the circuitry is configured: to receive user identification to identify a user, and wherein in order to control the at least one virtual camera, the circuitry is configured to select a replay control script corresponding to the detected event and the identified user from a selection of replay control scripts storage unit, and control the at least one virtual camera using control instructions contained in the replay control script.

23. The apparatus according to clause 22, wherein the circuitry is configured to enable a user to edit control instructions contained in a replay control script.

24. The apparatus according to any of clause 17 to 23, wherein the circuitry is configured to continue to produce a stream of video data of the virtual environment using the at least one virtual cameras controlled in dependence upon a previously detected event within the virtual environment for a duration of the interruption.

25. The apparatus according to any preceding clause wherein the circuitry is configured to assign a priority to previously detected events in the virtual environment and control at least one virtual camera in the virtual environment in dependence upon the priority assigned to previously detected events within the virtual environment, and produce a stream of video data of the virtual environment using the at least one virtual camera.

26. The apparatus according to any preceding clause, wherein the apparatus is configured to generate control information for display of a graphical user interface, the graphical user interface comprising a display portion showing the stream of video data of the virtual environment and one or more additional display portions, the one or more additional display portions showing a view from virtual cameras in the virtual environment which are not being used to produce the stream of video data.

27. A method of producing a stream of video data of a virtual environment, the method comprising:

receiving a virtual environment from a virtual environment provider, the virtual environment being output of a simulation of a physical environment;

detecting occurrence of an event in the virtual environment;

controlling at least one virtual camera in the virtual environment in dependence upon a detected event within the virtual environment, wherein the at least one virtual camera captures a view within the virtual environment; and producing a stream of video data of the virtual environment using the at least one virtual camera.

28. A computer program comprising instructions which, when executed by a computer, cause the computer to perform a method of producing a stream of video data of a virtual environment, the method comprising:

receiving a virtual environment from a virtual environment provider, the virtual environment being output of a simulation of a physical environment;

detect occurrence of an event in the virtual environment;

controlling at least one virtual camera in the virtual environment in dependence upon a detected event within the virtual environment, wherein the at least one virtual camera captures a view within the virtual environment; and producing a stream of video data of the virtual environment using the at least one virtual camera.

Obviously, numerous modifications and variations of the present disclosure are possible in light of the above teachings. It is therefore to be understood that within the scope of the appended claims, the disclosure may be practiced otherwise than as specifically described herein.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognize that various features of the described embodiments may be combined in any manner suitable to implement the technique.

What is claimed is:

1. An apparatus for producing a stream of video data of a virtual environment, the apparatus comprising circuitry configured to:

acquire a virtual environment, the virtual environment being output of a simulation of a physical environment;

detect occurrence of an event in the virtual environment;

control at least one virtual camera in the virtual environment in dependence upon a detected event within the virtual environment, wherein the at least one virtual camera captures a view within the virtual environment, wherein in order to control the at least one virtual camera in accordance with the detected event, the circuitry is configured to: select a control script corresponding to the detected event from a selection of control scripts stored in a storage unit, and control the at least one virtual camera using control instructions contained in the control script, wherein the storage unit stores different control scripts for different users and wherein the circuitry is configured: to receive user identification to identify a user, and wherein in order to control the at least one virtual camera, the circuitry is configured to select a control script corresponding to the detected event and the identified user from a selection of control scripts storage unit, and control the at least one virtual camera using control instructions contained in the control script; and produce a stream of video data of the virtual environment using the at least one virtual camera.

2. The apparatus according to claim 1, wherein the physical environment is a sporting match.

3. The apparatus according to claim 2, wherein the event is an event in the sporting match comprising at least one of: a shot, a goal, an offside, a sending off, a substitution, a foul and/or a pass.

4. The apparatus according to claim 1, wherein when the at least one virtual camera comprises a plurality of virtual cameras, each of the plurality of virtual cameras captures a different view within the virtual environment.

5. The apparatus according to claim 1, wherein the control instructions include instructions defining: a selection of a virtual camera, a time period for how long a virtual camera should be selected, a movement of a virtual camera, a transition between virtual cameras and/or instructions to generate a new virtual camera in the virtual environment.

6. The apparatus according to claim 1, wherein the circuitry is configured to enable a user to edit control instructions contained in a control script.

7. The apparatus according to claim 1, wherein when multiple control scripts exist for the detected event, the circuitry is configured to execute the control scripts in accordance with a priority level of the control scripts.

8. The apparatus according to claim 7, wherein the circuitry is configured to execute the script with the highest priority level; or wherein the circuitry is configured to execute the multiple control scripts in a sequence starting with the script with the highest priority level.

9. The apparatus according to claim 1, wherein the circuitry is configured to acquire the virtual environment from a virtual environment provider.

10. The apparatus according to claim 9, wherein the circuitry is configured to store the virtual environment in a storage unit as it is received from the virtual environment provider.

11. The apparatus according to claim 10, wherein the circuitry is configured to introduce a predetermined time delay between the stream of video data and the virtual environment as acquired from the virtual environment provider.

12. An apparatus for producing a stream of video data of a virtual environment, the apparatus comprising circuitry configured to:

acquire a virtual environment from a virtual environment provider, the virtual environment being output of a simulation of a physical environment;

store the virtual environment in a storage unit as it is received from the virtual environment provider;

detect occurrence of an event in the virtual environment;

control at least one virtual camera in the virtual environment in dependence upon a detected event within the virtual environment, wherein the at least one virtual camera captures a view within the virtual environment; and produce a stream of video data of the virtual environment using the at least one virtual camera, wherein the circuitry is configured to pre-select a virtual camera in the virtual environment upon detection of the detected event and control the pre-selected virtual camera in the virtual environment in dependence upon the detected event within the virtual environment when a time corresponding to a predetermined time delay has expired after detection of the detected event.

13. The apparatus according to claim 1, wherein the circuitry is further configured to: detect an interruption in the virtual environment, control at least one virtual camera in the virtual environment in dependence upon a previously detected event within the virtual environment, and produce a stream of video data of the virtual environment using the at least one virtual camera.

14. The apparatus according to claim 13, wherein in order to control the at least one virtual camera in accordance with the previously detected event, the circuitry is configured to: select a replay control script corresponding to the previously detected event from a selection of replay control scripts stored in a storage unit, and control the at least one virtual camera using control instructions contained in the replay control script.

15. The apparatus according to claim 13, when a plurality of events have been previously detected, the circuitry is configured to select one or more previously detected events from the plurality of previously detected events in accordance with at least one of: a priority level of each of the plurality of previously detected events, an order of each of the plurality of previously detected events, a maximum number of previously detected events which can be selected and/or a category of each of the plurality of previously detected events.

16. The apparatus according to claim 13, wherein the control instructions of the replay control scripts include instructions defining: a selection of a virtual camera, a time period for how long a virtual camera should be selected, a movement of a virtual camera, a transition between virtual cameras, instructions to generate a new virtual camera in the virtual environment, a playback speed for a virtual camera, and/or a portion of the previously detected event for which a virtual camera should be selected.

17. The apparatus according to claim 14, wherein the storage unit stores different replay control scripts for different users and wherein the circuitry is configured: to receive user identification to identify a user, and wherein in order to control the at least one virtual camera, the circuitry is configured to select a replay control script corresponding to the detected event and the identified user from a selection of replay control scripts storage unit, and control the at least one virtual camera using control instructions contained in the replay control script.

18. A non-transitory computer readable medium storing a computer program comprising instructions that, when executed by a computer, cause the computer to perform a method of producing a stream of video data of a virtual environment, the method comprising:

receiving a virtual environment from a virtual environment provider, the virtual environment being output of a simulation of a physical environment;

detecting an occurrence of an event in the virtual environment;

controlling at least one virtual camera in the virtual environment in dependence upon a detected event within the virtual environment, wherein the at least one virtual camera captures a view within the virtual environment;

producing a stream of video data of the virtual environment using the at least one virtual camera;

detecting an interruption in the virtual environment;

controlling at least one virtual camera in the virtual environment in dependence upon a previously detected event within the virtual environment, wherein in order to control the at least one virtual camera in accordance with the previously detected event, the method comprises: selecting a replay control script corresponding to the previously detected event from a selection of replay control scripts stored in a storage unit, and controlling the at least one virtual camera using control instructions contained in the replay control script, wherein the storage unit stores different replay control scripts for different users and wherein the method further comprises receiving user identification to identify a user, and wherein in order to control the at least one virtual camera, selecting a replay control script corresponding to the previously detected event and the identified user from the selection of replay control scripts stored in the storage unit, and controlling the at least one virtual camera using control instructions contained in the replay control script; and producing a stream of video data of the virtual environment using the at least one virtual camera controlled in dependence upon the previously detected event.

* * * * *